United States Patent [19]

Goldschmidt et al.

[11] 3,880,597
[45] Apr. 29, 1975

[54] DEVICE FOR SEPARATING SO₂ AND DUST FROM FLUE GASES

[75] Inventors: Klaus Goldschmidt; Gerhard Hausberg, both of Essen, Germany

[73] Assignees: Steag Aktiengesellschaft, Essen; Gottfried Bischoff Bau Kompl., Gasreinigungs, both of Germany

[22] Filed: Oct. 12, 1972

[21] Appl. No.: 296,774

[30] Foreign Application Priority Data
Oct. 12, 1971 Germany.................... 2150835

[52] U.S. Cl................ 23/283; 55/220; 55/262; 55/431; 261/DIG. 9; 261/115; B01d/47/00
[51] Int. Cl.............................................. B01j 1/14
[58] Field of Search........... 55/223, 224, 230, 257, 55/258, 260, 307, 308, 431, 73, 261, 262, 418; 261/115–118, DIG. 9; 23/277 R, 283, 278

[56] References Cited
UNITED STATES PATENTS

| | | | |
|---|---|---|---|
| 3,009,687 | 11/1961 | Hendriks............................ | 261/118 |
| 3,167,413 | 1/1965 | Kickens et al................. | 261/DIG. 9 |
| 3,388,897 | 6/1968 | Calaceto............................ | 261/118 |
| 3,442,232 | 5/1969 | White............................ | 261/DIG. 9 |
| 3,456,928 | 7/1969 | Selway................................ | 55/223 |
| 3,494,099 | 2/1970 | Eng et al.............................. | 55/223 |
| 3,511,027 | 5/1970 | Roberts et al. .................... | 55/73 |
| 3,597,901 | 8/1971 | Heeney.............................. | 55/257 |
| 3,773,472 | 11/1973 | Hausberg et al..................... | 23/283 |

FOREIGN PATENTS OR APPLICATIONS
925,711  5/1963  United Kingdom................ 261/118

Primary Examiner—Frank W. Lutter
Assistant Examiner—David L. Lacey
Attorney, Agent, or Firm—McGlew and Tuttle

[57] ABSTRACT

A spray tower for separating contaminants from fumes, in which the cleaning process is favored by introducing into the supplied gas calcareous additives, comprises a tower structure, an inlet tube feeding the tower from above, bottom outlets for clean gas and for sludge water, and wash water spraying nozzles arranged vertically in the tower axis. In order to avoid calcareous accretions on the tower walls and also to permit the use of lime dust as additive, the device for injecting additives is located in the feed tube. This tube is extended downwards by an intake sleeve and additional spraying nozzles are provided around the intake sleeve which are adapted to rinse the tower walls and produce a screen of wash water enclosing the incoming stream. The screen effect is increased by the addition of radially spraying nozzles. In a preferred embodiment, the tower is roofed by a frustoconical cover surrounding the intake sleeve and proportioned to the dimensions thereof, the additional nozzles being located between this cover and the intake sleeve, and the device injecting additives being arranged in vertical direction above the intake sleeve, in or close to a bend of the feed tube which is provided with guiding baffles.

2 Claims, 1 Drawing Figure

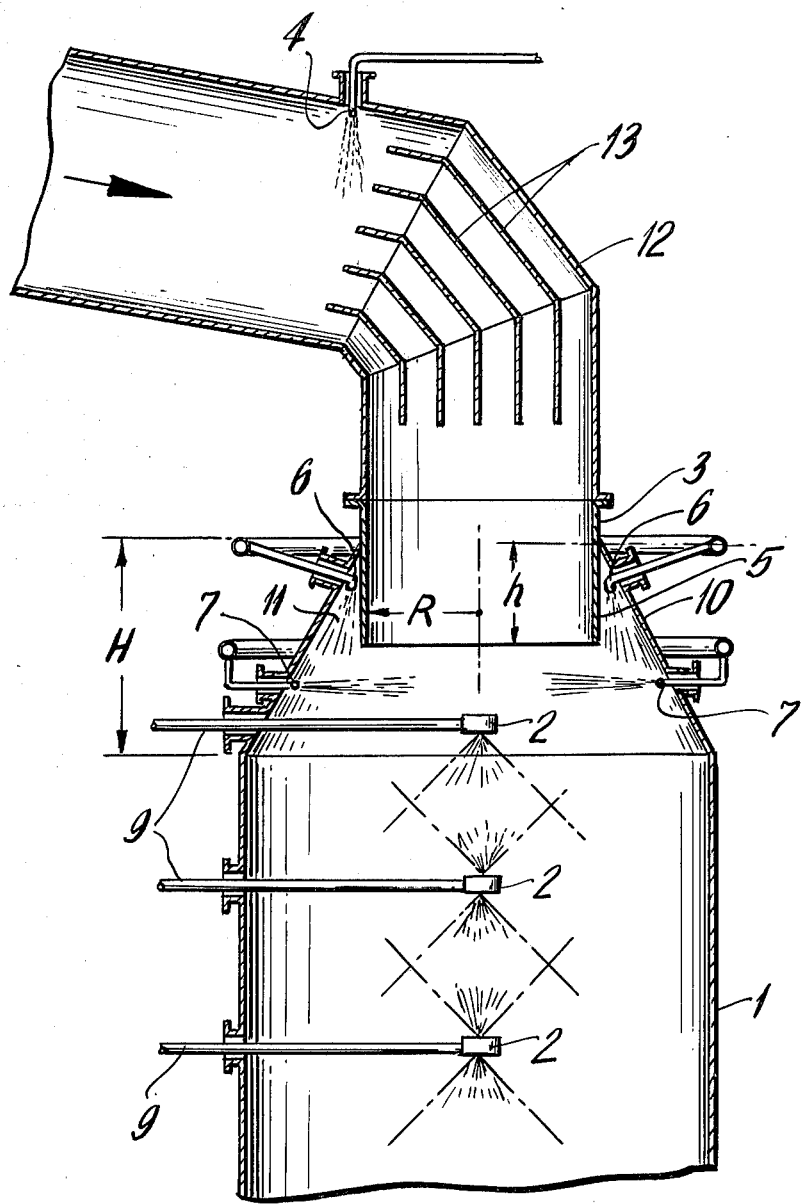

DEVICE FOR SEPARATING SO₂ AND DUST FROM FLUE GASES

BACKGROUND OF THE INVENTION

1. Field of the Invention

This invention relates in general to gas-treatment devices and, in particular, to a new and useful spray tower for separating $SO_2$ dust from flue gases and comprising an upper inlet tube extending into a vertically elongated tower space and defining an intake sleeve, with a bank of wash water injecting nozzles arranged vertically in the tower axis, additional nozzles producing a wash water screen around the inflow and surrounding the intake sleeve, and a device for injection of additives located on the upstream side and introducing lime dust or a lime/water suspension into the contaminated gas.

2. Description of the Prior Art

In a known device of this type, the flue gases are supplied at the bottom of the spray tower and the clean gas is evacuated at the top. It has already been proposed that fine grained, particularly alkaline additives (among which especially calcareous powders ($CaO$, $Ca(OH)_2$, $CaCO_3$) have properties well suited for this purpose) be added to the flue gases. In practical operation with this known device, a lime/water suspension is injected in the gas stream, together with wash water, through swirl nozzles arranged in the central axis one above the other. Because gas and water are conducted in countercurrent, the resulting contact times are relatively short. The contact path also is short, particularly for the lime/water suspension furnished by the lower nozzles. Perhaps with a lime/water suspension, satisfying results may yet be obtained, but lime dust can hardly be added in this way. In such a case, undesirable accretions, composed partly of lime dust and partly of impurities conveyed by the fumes, would be deposited in the tower around the regions where the additive might be injected.

SUMMARY OF THE INVENTION

In accordance with the present invention, there is provided an improved spray tower in which lime dust or a lime/water suspension as additive is injected into a contaminated gas stream without any formation of accretions on the tower walls and which shows a good efficiency. The device comprises a tower structure in which an appropriate number of spraying nozzles for injection of wash water are arranged in the vertical tower axis one above the other and the flue gas stream is introduced from above through a feed tube connected at the top and terminating in an intake sleeve which extends down into the interior of the tower. An injection device for introducing additives is located in the feed tube, so that the flue gas stream becomes a mixture containing not only contaminants, but also the additive.

The invention provides additional nozzles arranged in an annular zone around and at the level of the intake sleeve and intended for spraying wash water downwardly, vertically and also against the walls. These additional nozzles are located close to the intake sleeve so that, by their action, a screen of fine wash water particles is produced, which encloses the gas stream coming out from the sleeve. This effect is advantageously supported by the action of additional nozzles located in an annular space at a level directly below the lower border of the intake sleeve. The incoming relatively dry and unimpeded jet of gas conveying the contaminants and the additive, on the interior of the infeed tube are definitely separated from the surrounding wet part of the tower space which is located below the bottom end of the infeed tube and in an area at the top of the tower around the exterior of the lower end of the infeed tube, and intermixes with the wash water of this part only by way of diffusion. No doubt, particles of lime dust still will reach the walls of the tower, however, the rinsing of the walls effected by the additional nozzles will permit no accretions. The whole height of the spray tower may then fully be utilized as a contact region. Consequently, this inventive arrangement results in a substantially increased efficiency.

As for particulars, there exist various possibilities of providing further arrangements developing the invention. Thus, in accordance with a preferred embodiment easily adaptable to different operative conditons, the intake sleeve terminating the feed tube is surrounded and embraced by a frustoconical cover which roofs the spray tower and the additional nozzles are located in the space which is delimited by the cover and the sleeve. The device for injection of additive lime dust is advantageously arranged in a vertical direction above the intake sleeve. In this case, the frustoconical cover should be higher than the sleeve part within the tower, i.e., below the cover, by approximately the radius of the sleeve. In general, the diameter of the intake sleeve is exactly equal to the diameter of the feed tube. However, it is also possible to provide different diameters, in order to adapt the inventive device to special conditions. The additional nozzles surrounding the intake sleeve are, as a rule, usual spraing nozzles, while the main nozzles in the tower axis may be swirl nozzles.

Accordingly, it is an object of the invention to provide a device for separating $SO_2$ and dust from flue gases or fumes, particularly a spray tower, which comprises a tower structure, a bank of vertically arranged main nozzles in the tower for injecting wash water into the gas stream, an upper inlet in form of a feed tube extending into the tower and terminating well within the tower in an intake sleeve, two bottom outlets, one for clean gas and the other for sludge water, and additional nozzles which are located in an annular space around and close to the intake sleeve.

According to another feature of the invention, the additional nozzles are adapted to spray wash water downwardly so as to provide for a continuous rinsing of the tower walls and, at the same time, to produce below the lower border of the intake sleeve, a sort of screen of fine wash water particles enclosing the incoming gas stream.

In order to permit a further increase of the efficiency, still another object of the invention is to provide, in the upper part of the spray tower, further additional nozzles which are arranged in an annular space below the lower border of the intake sleeve and at greater distances from the central axis than the first additional nozzles, these further additional nozzles being adapted to spray wash water in radial inward direction so as to support the action of the first additional nozzles.

According to a preferred embodiment, a further object of the invention is to provide a frustoconical tower cover widening downwardly which surrounds and embraces, by its upper boarder, the intake sleeve of the feed tube, thus forming a roof of the spray tower, and to locate the additional nozzles in the space delimited by this cover and the intake sleeve, the height of the cover being advantageously equal to the height of the intake sleeve within the cover, increased by the amount of the radius of the intake sleeve and the device for injecting additives being located in vertical direction above the intake sleeve, preferably in the zone of a bend which forms a part of the feed tube and which may include guide baffles of approximately streamline shape.

For an understanding of the principles of the invention, reference is made to the following description of typical embodiments thereof as illustrated in the accompanying drawing.

BRIEF DESCRIPTION OF THE DRAWING

The single FIGURE of the drawing is a schematic vertical sectional view of the upper part of a spray tower constructed according to the invention.

GENERAL DESCRIPTION OF THE PREFERRED EMBODIMENT

Referring to the drawing in particular, the invention embodied therein comprises a spray tower for separating $SO_2$ and dust from flue gases. The tower 1 includes a cylindrical tower structure with main nozzles 2 arranged one above the other along the vertical axis of the tower and adapted to spray wash water (which may be mixed with a moistening agent) into the gas stream. An upper inlet or feed tube 3 for contaminated gas connects into a tower roof or cover 10 of frustoconical form. A bottom outlet for clean gas and a bottom outlet for sludge water (not shown) are provided at the bottom end of the tower 1.

In accordance with the invention, a device 4 for injecting lime dust as an additive into the contaminated gas is provided in the feed tube 3. The feed tube is terminated by an intake sleeve 5 which extends into the roof 10 of the spray tower 1. The intake sleeve 5 is surrounded by additional nozzles 6 and 7 for injecting wash water. The nozzles 6 are located at the level of and close to the intake sleeve and adapted to spray water downwardly so as to assure rinsing of the tower walls and, at the same time, to produce below the lower border of the intake sleeve a screen of fine particles of wash water. The nozzles 7 are located at a lower level and adapted to spray water radially inwardly so as to support the action of nozzles 6. Not too far below the intake sleeve 5, the main nozzles 2 of the spray tower 1 are arranged one above the other and adapted to inject wash water into the gas stream. These nozzles are connected to corresponding wash water supplying pipes 9 and may take the form of swirl nozzles.

The device 4 for injecting lime dust as an additive is a simple inlet pipe through which a lime-dust/air mixture is blown in. It would also be possible to use as an additive a lime/water suspension. In such a case, however, the suspension must be injected in fine dispersion and within the intake sleeve 5.

In the present example, and according to the preferred embodiment of the invention, the intake sleeve is surrounded by a frustoconical cover 10 which, at the same time, forms the roof of the spray tower 1. In the annular space 11 thus produced between the intake sleeve and the cover, there are located the additional nozzles 6, mentioned above. The frustoconical cover is dimensioned so that its whole height H is equal to the height $h$ of the intake sleeve plus the radius R of the sleeve. This geometry has proven to be able to definitely and neatly separate the dry zone in the feed tube 3 from the wet zone in the tower below the bottom end of the tube 3 and in the top of the tower in an area around the exterior of the lower end of the infeed tube 3 having the spray nozzles 7.

In the present example, the feed tube 3 connected to the spray tower includes a bend 12 of approximately 90°. The device 4 for injection of the lime dust is advantageously located in this bend. However, inasmuch as in the present example, guide baffles 13 for the gas stream are also arranged within the bend 12, the injecting device 4 is located immediately before the bend.

While a specific embodiment of the invention has been shown and described in detail to illustrate the application of the principles of the invention, it will be understood that the invention may be embodied otherwise without departing from such principles.

What is claimed is:

1. A device for separating $SO_2$ and dust from flue gases, particularly a spray tower, comprising a vertically extending tower, an upper inlet for contaminated gas in the form of a feed tube extending into the tower from above and terminating in an intake sleeve located within the top of said tower, an injection device for injecting a calcareous additive into the contaminated gas stream located in said feed tube, means for supplying calcareous additive to said injection device, a plurality of main nozzles for injecting wash water into the gas stream which are arranged along the tower axis one above the other, a plurality of first additional nozzles located in said tower in an annular zone around and close to said intake sleeve and arranged to spray wash water downwardlly so as to provide for a continuous rinsing of the tower walls and, at the same time, to produce below the lower border of the intake sleeve a screen of fine wash water particles surrounding the incoming stream and separating the same from the tower walls, and a plurality of second additional nozzles located in an annular zone below the lower border of said intake sleeve and arranged to spray wash water in radial inward direction so as to support the action of said first additional nozzles, said spray tower including a frustoconical roof widening in a downward direction and which surrounds and embraces, by its upper border, said intake sleeve, said device for injecting the additive being arranged to discharge vertically into said intake sleeve, and said first additional nozzles are located in the space between said roof and said intake sleeve, said second additional nozzles being located directly below said intake sleeve adjacent the bottom of said roof, the height of said frustoconical cover being preferably equal to the height of said intake sleeve within the cover, plus approximately the radius of said sleeve.

2. A device for separating $SO_2$ and dust from flue gases, according to claim 1, wherein said feed tube includes a bend having baffles therein dividing the gas flow and said device for injecting the additive is located in the bend forming part of said feed tube.

* * * * *